(12) United States Patent
Chen

(10) Patent No.: US 9,654,254 B2
(45) Date of Patent: May 16, 2017

(54) METHOD AND DEVICE FOR REDUCING BIT ERROR RATE IN CDMA COMMUNICATION SYSTEM

(71) Applicant: ZTE Corporation, Shenzhen, Guangdong (CN)

(72) Inventor: Zhongping Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/762,205

(22) PCT Filed: Jul. 12, 2013

(86) PCT No.: PCT/CN2013/079310
§ 371 (c)(1),
(2) Date: Jul. 21, 2015

(87) PCT Pub. No.: WO2013/167033
PCT Pub. Date: Nov. 14, 2013

(65) Prior Publication Data
US 2015/0358119 A1 Dec. 10, 2015

(30) Foreign Application Priority Data

Jan. 21, 2013 (CN) .......................... 2013 1 0021386

(51) Int. Cl.
*H04L 1/00* (2006.01)
*H04L 27/36* (2006.01)
(Continued)

(52) U.S. Cl.
CPC ......... *H04L 1/0078* (2013.01); *H04B 1/7075* (2013.01); *H04L 27/364* (2013.01); *H04W 56/001* (2013.01)

(58) Field of Classification Search
CPC ................ H04B 1/7073; H04B 1/7075; H04B 2001/70935; H04L 27/364; H04L 1/0078
See application file for complete search history.

(56) References Cited

U.S. PATENT DOCUMENTS

| | | |
|---|---|---|
| 6,771,688 B1 | 8/2004 | Lee |
| 2002/0141482 A1 | 10/2002 | Agami |

(Continued)

FOREIGN PATENT DOCUMENTS

| | | |
|---|---|---|
| CN | 1540896 A | 10/2004 |
| CN | 1778055 A | 5/2006 |

(Continued)

OTHER PUBLICATIONS

Yi Wan and Zhongping Chen, "A Novel Synchronization Method for DS-CDMA Systems", Wireless Communications and Mobile Computing Conference (IWCMC), 2012 8th International, Lanzhou University, China, IEEE, Aug. 27-31, 2012.*

(Continued)

*Primary Examiner* — Aristocratis Fotakis
(74) *Attorney, Agent, or Firm* — Oppedahl Patent Law Firm LLC

(57) ABSTRACT

A method and a device for reducing a bit error rate in a Code Division Multiple Access (CDMA) communication system are described, wherein this method includes: a sample sequence $I_{in}$ of an in-phase component signal I, and a sample sequence $Q_{in}$ of a quadrature component signal Q are obtained, and the signals are sent by a signal sending end; the obtained sample sequence $I_{in}$ and the sample sequence $Q_{in}$ are divided into different groups according to a sample number Ns of a chip, a sum-average operation is performed on a signal in each group, and a corresponding signal group is determined, wherein, the signal group determined by performing the sum-average operation on the sample sequence $I_{in}$ is $W_I$, the signal group determined by perform- (Continued)

ing the sum-average operation on the sample sequence $Q_{in}$ is $W_Q$; and a signal in the signal group $W_I$ and the signal group $W_Q$ is grouped to determine a signal belonging to the same chip in the sample sequence which experiences the sum-average operation, and the determined signal is output. The disclosure solves a problem in the related art that a CDMA synchronization method possesses a wrong sampling situation, which results in a high bit error rate of a receiving end, and reduces the bit error rate.

6 Claims, 5 Drawing Sheets

(51) Int. Cl.
  *H04W 56/00* (2009.01)
  *H04B 1/7075* (2011.01)

(56) References Cited

U.S. PATENT DOCUMENTS

| | | |
|---|---|---|
| 2003/0202564 A1 | 10/2003 | Ho |
| 2004/0008759 A1* | 1/2004 | Yang ................... H04B 1/7093 375/152 |
| 2004/0165657 A1 | 8/2004 | Simic |
| 2004/0166873 A1 | 8/2004 | Simic |
| 2006/0133464 A1* | 6/2006 | Demir ................ H04B 1/70735 375/150 |
| 2008/0002797 A1 | 1/2008 | Raman |
| 2009/0010363 A1 | 1/2009 | Kobayashi |
| 2011/0105148 A1* | 5/2011 | Russell .............. H04B 1/70757 455/456.1 |
| 2012/0236973 A1 | 9/2012 | Raman |

FOREIGN PATENT DOCUMENTS

| | | |
|---|---|---|
| CN | 101888258 A | 11/2010 |
| CN | 103051356 A | 4/2013 |
| EP | 1189358 A1 | 3/2002 |

OTHER PUBLICATIONS

STEL-2000A data sheet, Intel, Dec. 1999.*
International Search Report in international application No. PCT/CN2013/079310, mailed on Oct. 31, 2013.
English Translation of the Written Opinion of the International Search Authority in international application No. PCT/CN2013/079310, mailed on Oct. 31, 2013.
Supplementary European Search Report in European application No. 13788518.2, mailed on Jan. 18, 2016.

* cited by examiner

METHOD AND DEVICE FOR REDUCING BIT ERROR RATE IN CDMA COMMUNICATION SYSTEM

TECHNICAL FIELD

The disclosure relates to the field of communications, and particularly to a method and a device for reducing a bit error rate in a Code Division Multiple Access (CDMA) communication system.

BACKGROUND

In a CDMA communication system, a data transmission synchronization problem is very important, if the data transmission synchronization problem of a receiving end and a sending end, it may be caused that a transmission device cannot perform normal communication. There are many traditional CDMA system synchronization methods, for example, in a synchronization capture phase, the sending end first sends a synchronization sequence to the receiving end, and the receiving end establishes synchronization between the receiving end and the sending end after receiving the synchronization sequence of the sending end, and then switches to a data state to perform data transmission. This synchronization method adopts different Pseudo-Noise (PN) codes in a synchronization signal capture phase and a data processing phase. Currently, a typical representative synchronization algorithm of a spreading chip STEL-2000A adopts twice sampling at a front end of a digital matched filter, a sample value after twice sampling and weighted averaging is sent to the matched filter.

A similarity of a traditional synchronization method is to use a relevant feature of the PN code to perform synchronization of the receiving end and the sending end, a difference is a chip sampling time of the front end of the matched filter. However, with regard to a relatively maturely applied currently CDMA synchronization technique, a wrong sampling situation at the front end of the matched filter is neglected. Specifically, an ideal sampling situation is shown in FIG. 1 ($a$), that is, chips $d_{i-1}$, $d_i$, $d_{i+1}$ sample twice separately, and samples correspond to each chip separately are $a_{i-1}$, $b_{i-1}$, $a_i$, $b_i$, $a_{i+1}$, $b_{i+1}$, and weighted average is performed on information sampled by each chip, namely $(a_{i-1}+b_{i-1})/2$, $(a_i+b_i)/2$, $(a_{i+1}+b_{i+1})/2$. However, in actual operation, this situation may exist: the weighted twice samples do not come from the same chip, but come from adjacent chips, as shown in FIG. 1 ($b$) or FIG. 2, after the sample is weighted, $(a_i+b_i)/2$ is sent to the matched filter, because $a_i$ and $b_i$ do not come from the same chip, that is wrong sampling is caused. In addition, although it is in the ideal sampling situation, wrong sampling may be caused all because of data jitter, delay, jitter of a local clock, and a Doppler effect. The wrong sampling may bring a serious inter-chip interference, the wrong sampling at a place at which a positive electrical level and a negative electrical level of a PN chip alternate results in a very small weighted sample value, and finally results in a high bit error rate of the receiving end.

Aiming at a problem in the related art that a CDMA synchronization method possesses the wrong sampling situation, which results in a high bit error rate of the receiving end, an effective solution has not been proposed currently.

SUMMARY

An embodiment of the disclosure provides a method and a device for reducing a bit error rate in a CDMA communication system, so as to solve a problem in the related art that a CDMA synchronization method possesses a wrong sampling situation, which results in a high bit error rate of a receiving end.

In order to solve the above technical problem, in one aspect, an embodiment of the disclosure provides a method for reducing a bit error rate in a CDMA communication system, which includes: obtaining a sample sequence $I_{in}$ of an in-phase component signal I, and a sample sequence $Q_{in}$ of a quadrature component signal Q, which are sent by a signal sending end; dividing the obtained sample sequence $I_{in}$ and the sample sequence $Q_{in}$ into different groups according to a sample number Ns of a chip, performing a sum-average operation on a signal in each group, and determining a corresponding signal group, wherein each signal group contains the signal experiencing the sum-average operation, the signal group determined by performing the sum-average operation on the sample sequence $I_{in}$ is $W_I$, the signal group determined by performing the sum-average operation on the sample sequence $Q_{in}$ is $W_Q$; and grouping a signal in the signal group $W_I$ and the signal group $W_Q$, to determine a signal belonging to the same chip in the sample sequence which experiences the sum-average operation, and outputting the determined signal.

Preferably, the dividing the obtained sample sequence $I_{in}$ and the sample sequence $Q_{in}$ into different groups according to the sample number Ns of the chip, performing the sum-average operation on the signal in each group, and determining the corresponding signal group, may include: dividing adjacent Ns samples in the sample sequence $I_{in}$ into one group, successively performing the sum-average operation on Ns samples in each group, and determining the signal group $W_I$; and dividing adjacent Ns samples in the sample sequence $Q_{in}$ into one group, successively performing the sum-average operation on Ns samples in each group, and determining the signal group $W_Q$.

Preferably, grouping the signal in the determined signal group $W_I$ and signal group $W_Q$, may include: in the signal group $W_I$, beginning from a first signal, extracting a signal after Ns−1 signals, successively combining each extracted signal into one group; beginning from a second signal, extracting a signal after Ns−1 signals, successively combining each extracted signal into one group, and so on, obtaining Ns groups of signals, which are successively marked as $W_{I1}$, $W_{I2}$, ... $W_{INs}$; and in the signal group $W_Q$, beginning from a first signal, extracting a signal after Ns−1 signals, successively combining each extracted signal into one group; beginning from a second signal, extracting a signal after Ns−1 signals, successively combining each extracted signal into one group, and so on, obtaining Ns groups of signals, which are successively marked as $W_{Q1}$, $W_{Q2}$, ... $W_{QNs}$.

Preferably, the determining the signal belonging to the same chip in the sample sequence which experiences the sum-average operation, and outputting the determined signal, may include: sending $W_{I1}$, $W_{I2}$, ... $W_{INs}$ into a matched filter meeting a pre-set condition, obtaining a corresponding output result, and marking the output results separately as $y_{I1}$, $y_{I2}$, ... $y_{Ins}$; sending $W_{Q1}$, $W_{Q2}$, ... $W_{QNs}$ into the matched filter, obtaining a corresponding output result, and marking the output results separately as $y_{Q1}$, $y_{Q2}$, ... $y_{QNs}$; determining signal amplitude values $y_1$, $y_2$, ... $y_{Ns}$ grouped by the in-phase component signal I and the quadrature component signal Q, according to the output results $y_{I1}$, $y_{I2}$, ... $y_{Ins}$ and the output results $y_{Q1}$, $y_{Q2}$, ... $y_{QNs}$; and determining the signal belonging to the same chip, according to the determined signal amplitude value, and outputting the determined signal.

Preferably, the determining signal amplitude values $y_1, y_2, \ldots y_{Ns}$ grouped by the in-phase component signal I and the quadrature component signal Q, according to the output results $y_{I1}, y_{I2}, \ldots y_{Ins}$ and the output results $y_{Q1}, y_{Q2}, \ldots y_{QNs}$, and determining the signal belonging to the same chip, according to the determined signal amplitude value, and outputting the determined signal, may include: determining the signal amplitude values $y_1, y_2, \ldots y_{Ns}$ according to a following formula:

$y_1 = \sqrt{Y_{I1}^2 + Y_{Q1}^2}, y_2 = \sqrt{Y_{I2}^2 + Y_{Q2}^2}, \ldots y_{Ns} = \sqrt{Y_{INs}^2 + Y_{QNs}^2}$;

and taking a signal corresponding to a maximum signal amplitude value as the signal belonging to the same chip, and outputting the signal corresponding to the maximum signal amplitude value.

In another aspect, an embodiment of the disclosure further provides a device for reducing a bit error rate in a CDMA communication system, which includes: an obtaining unit, configured to obtain a sample sequence $I_{in}$ of an in-phase component signal I, and a sample sequence $Q_{in}$ of a quadrature component signal Q, which are sent by a signal sending end; a sum-average unit, configured to divide the obtained sample sequence $I_{in}$ and the sample sequence $Q_{in}$ into different groups according to a sample number Ns of a chip, perform a sum-average operation on a signal in each group, and determine a corresponding signal group, wherein each signal group contains the signal experiencing the sum-average operation, the signal group determined by performing the sum-average operation on the sample sequence $I_{in}$ is $W_I$, the signal group determined by performing the sum-average operation on the sample sequence $Q_{in}$ is $W_Q$; and a grouping unit, configured to group a signal in the signal group $W_I$ and the signal group $W_Q$, to determine a signal belonging to the same chip in the sample sequence which experiences the sum-average operation, and output the determined signal.

Preferably, the sum-average unit may include: a first grouping sub-unit, configured to divide adjacent Ns samples in the sample sequence $I_{in}$ into one group, successively perform the sum-average operation on Ns samples in each group, and determine the signal group $W_I$; and a second grouping sub-unit, configured to divide adjacent Ns samples in the sample sequence $Q_{in}$ into one group, successively perform the sum-average operation on Ns samples in each group, and determine the signal group $W_Q$.

Preferably, the grouping unit may include:

a third grouping sub-unit, configured to, in the signal group $W_I$, begin from a first signal, extract a signal after Ns−1 signals, successively combine each extracted signal into one group; begin from a second signal, extract a signal after Ns−1 signals, successively combine each extracted signal into one group, and so on, obtain Ns groups of signals, which are successively marked as $W_{I1}, W_{I2}, \ldots W_{INs}$; and a third grouping sub-unit, configured to, in the signal group $W_Q$, begin from a first signal, extract a signal after Ns−1 signals, successively combine each extracted signal into one group; begin from a second signal, extract a signal after Ns−1 signals, successively combine each extracted signal into one group, and so on, obtain Ns groups of signals, which are successively marked as $W_{Q1}, W_{Q2}, \ldots W_{QNs}$.

Preferably, the grouping unit may further include: a first output sub-unit, configured to send $W_{I1}, W_{I2} \ldots W_{INs}$ into a matched filter meeting a pre-set condition, obtain a corresponding output result, and mark the output results separately as $y_{I1}, y_{I2}, \ldots y_{Ins}$; a second output sub-unit, configured to send $W_{Q1}, W_{Q2}, \ldots W_{QNs}$ into the matched filter, obtain a corresponding output result, and mark the output results separately as $y_{Q1}, y_{Q2}, \ldots y_{QNs}$; an amplitude value output sub-unit, configured to determine signal amplitude values $y_1, y_2, \ldots y_{Ns}$ grouped by the in-phase component signal I and the quadrature component signal Q, according to the output results $y_{I1}, y_{I2}, \ldots y_{Ins}$ and the output results $y_{Q1}, y_{Q2}, \ldots y_{QNs}$; and a signal output sub-unit, configured to determine the signal belonging to the same chip, according to the determined signal amplitude value, and output the determined signal.

Preferably, the amplitude value output sub-unit may include: an amplitude value calculating module, configured to determine the signal amplitude values $y_1, y_2, \ldots y_{Ns}$ according to a following formula: $y_1 = \sqrt{Y_{I1}^2 + Y_{Q1}^2}, y_2 = \sqrt{Y_{I2}^2 + Y_{Q2}^2}, \ldots y_{Ns} = \sqrt{Y_{INs}^2 + Y_{QNs}^2}$; and the signal output sub-unit may include: a signal output module, configured to take a signal corresponding to a maximum signal amplitude value as the signal belonging to the same chip, and output the signal corresponding to the maximum signal amplitude value.

An advantage of the disclosure is in the following:

In the embodiment of the disclosure, after performing the sum-average operation on a signal sample sequence, the signal is grouped; in the grouped signal, the sample sequence experiencing the sum-average operation from the same chip is selected, and the signal of the sample sequence from the same chip is output; this signal processing way solves the problem in the related art that a CDMA synchronization method possesses a wrong sampling situation, which results in a high bit error rate of a receiving end, and effectively reduces the bit error rate.

DETAILED DESCRIPTION

In order to solve a problem in the related art that a CDMA synchronization algorithm possesses a wrong sampling situation, which results in a high bit error rate of a receiving end, an embodiment of the disclosure provides a method and a device for reducing a bit error rate in a CDMA communication system, and the disclosure will be explained in detail below with reference to the drawings and in combination with embodiments. It shall be explained that, the embodiment in the application and a feature in the embodiment may be combined with each other without conflict.

Embodiment 1

Figure 1:
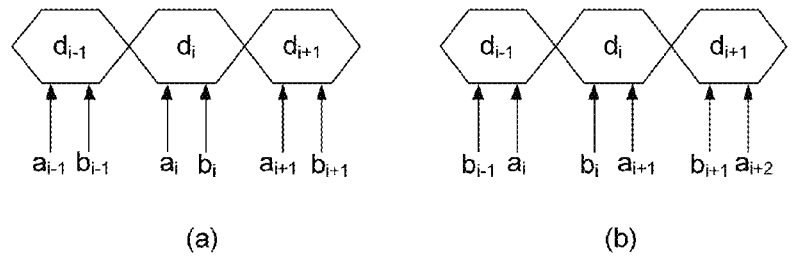
FIG. 1 is a diagram of a sampling way in a CDMA communication system.
Figure 2:
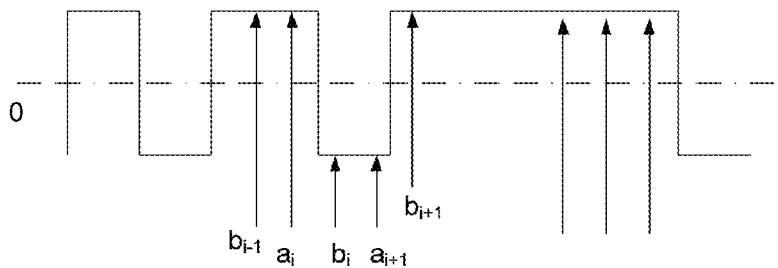
FIG. 2 is a diagram of a wrong sampling situation occurred in a CDMA communication system.
Figure 3:
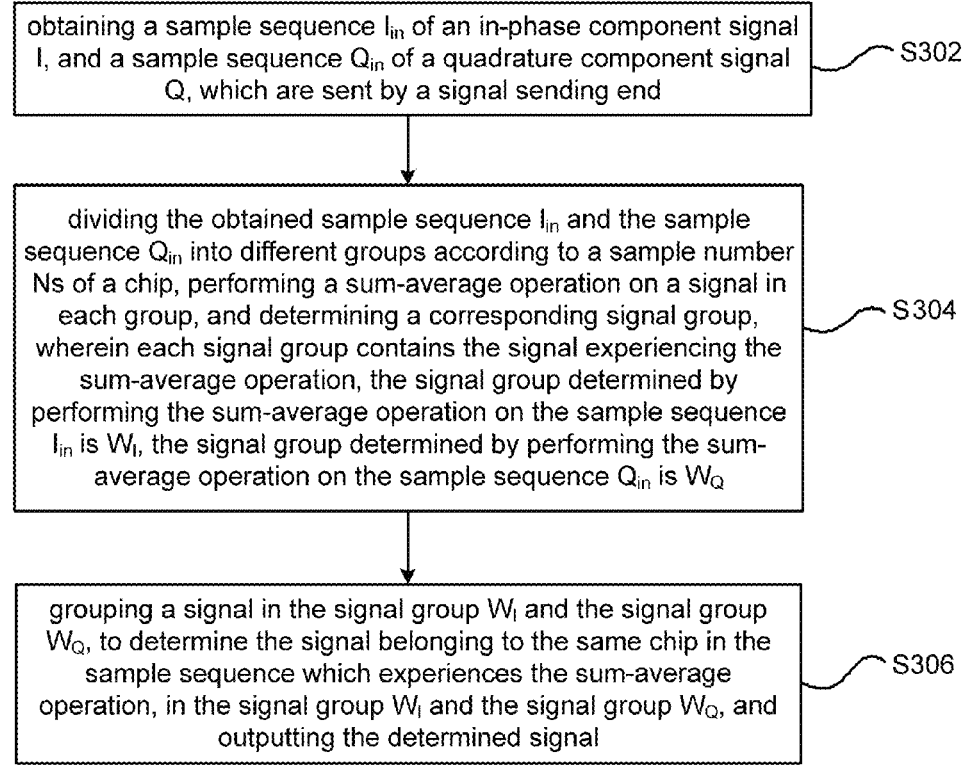
FIG. 3 is a preferred flowchart of a method for reducing a bit error rate in a CDMA communication system in an embodiment of the disclosure.

The preferred embodiment of the disclosure provides a method for reducing the core error rate in the CDMA communication system, and FIG. 3 shows a preferred flowchart of this method, as shown in FIG. 3, this method includes the following steps:

S302, obtaining a sample sequence $I_{in}$ of an in-phase component signal I, and a sample sequence $Q_{in}$ of a quadrature component signal Q, which are sent by a signal sending end;

S304, dividing the obtained sample sequence $I_{in}$ and the sample sequence $Q_{in}$ into different groups according to a sample number Ns of a chip, performing a sum-average operation on a signal in each group, and determining a corresponding signal group, wherein each signal group contains the signal experiencing the sum-average operation, the signal group determined by performing the sum-average operation on the sample sequence $I_{in}$ is $W_I$, the signal group determined by performing the sum-average operation on the sample sequence $Q_{in}$ is $W_Q$; and S306, grouping a signal in the signal group $W_I$ and the signal group $W_Q$, to determine the signal belonging to the same chip in the sample sequence which experiences the sum-average operation, in the signal group $W_I$ and the signal group $W_Q$, and outputting the determined signal.

In the above preferred embodiment, after performing the sum-average operation on a signal sample sequence, the signal is grouped; in the grouped signal, the sample sequence experiencing the sum-average operation from the same chip is selected, and the signal of the sample sequence from the same chip is output; this signal processing way solves the problem in the related art that the CDMA synchronization algorithm possesses the wrong sampling situation, which results in the high bit error rate of the receiving end, and effectively reduces the bit error rate.

Figure 4:
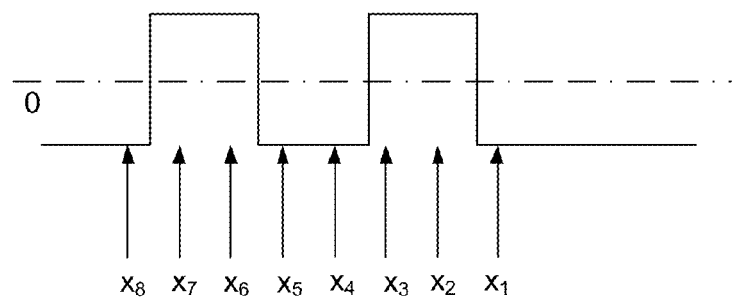
FIG. 4 is a diagram of a sample sequence in a method for reducing a bit error rate in a CDMA communication system in an embodiment of the disclosure.

In a preferred embodiment of the disclosure, a scheme is further provided, which groups and performs sum-average on the sample sequence $I_{in}$ and the sample sequence $Q_{in}$, and specifically, this scheme includes the following steps: dividing adjacent Ns samples in the sample sequence $I_{in}$ into one group, and successively performing the sum-average operation on Ns samples in each group, and determining the signal group $W_I$; and dividing adjacent Ns samples in the sample sequence $Q_{in}$ into one group, and successively performing the sum-average operation on Ns samples in each group, and determining the signal group $W_Q$. For example, it is assumed that a sample number of each chip is Ns=2, and the sample sequence $I_{in}$ is shown in FIG. 4, which successively contains the following samples: X1 X2, X3, X4, X5, X6, X7, X8, then 2 adjacent sample signals in the sample sequence are obtained, and experience the sum-average operation, to obtain the signal group $W_I$, which successively includes $$\frac{x1+x2}{2}, \frac{x2+x3}{2}, \frac{x3+x4}{2}, \frac{x4+x5}{2}, \frac{x5+x6}{2}, \frac{x6+x7}{2}, \frac{x7+x8}{2}.$$

Grouping the sample sequence $Q_{in}$ is the same as grouping the sample sequence $I_{in}$, and will not be repeated again.

In the above preferred technical scheme, grouping and sum-average are performed on all adjacent Ns samples in the sample sequence $I_{in}$ and the sample sequence $Q_{in}$, to guarantee that the signal experiencing the sum-average operation not only contains an ideal sampling situation, but also contains the wrong sampling situation, and to reduce the core error rate by selecting the signal in the ideal sampling situation.

In a preferred embodiment of the disclosure, a scheme is further provided, which groups the signal group $W_I$ and the signal group $W_Q$, specifically, this scheme includes the following steps:

in the signal group $W_I$, beginning from a first signal, extracting a signal after Ns−1 signals, successively grouping each extracted signal into one group; beginning from a second signal, extracting a signal after Ns−1 signals, successively grouping each extracted signal into one group, and so on, obtaining Ns groups of signals, which are successively marked as $W_{I1}, W_{I2}, \ldots, W_{INs}$; and in the signal group $W_Q$, beginning from a first signal, extracting a signal after Ns−1 signals, successively grouping each extracted signal into one group; beginning from a second signal, extracting a signal after Ns−1 signals, successively grouping each extracted signal into one group, and so on, obtaining Ns groups of signals, which are successively marked as $W_{Q1}, W_{Q2}, \ldots W_{QNs}$.

The example provided above is further explained, specifically, the above signal group $W_I$ is $$\frac{x1+x2}{2}, \frac{x2+x3}{2}, \frac{x3+x4}{2}, \frac{x4+x5}{2}, \frac{x5+x6}{2}, \frac{x6+x7}{2}, \frac{x7+x8}{2},$$

when performing grouping, beginning from the first signal, signal extraction is perform after 1 signal, therefore $$\frac{x1+x2}{2}, \frac{x3+x4}{2}, \frac{x5+x6}{2} \text{ and } \frac{x7+x8}{2}$$

are extracted successively, and are taken as the first group, $$\frac{x2+x3}{2}, \frac{x4+x5}{2}, \text{ and } \frac{x6+x7}{2}$$

are taken as the second group; it can be seen from FIG. 4, the group of data $$\frac{x1+x2}{2}, \frac{x3+x4}{2}, \frac{x5+x6}{2} \text{ and } \frac{x7+x8}{2}$$

do not come from the same chip, but come from adjacent chips, this is the wrong sampling situation; the group of data $$\frac{x2+x3}{2}, \frac{x4+x5}{2}, \text{ and } \frac{x6+x7}{2}$$

come from the same chip, this is the ideal sampling situation.

In a preferred embodiment of the disclosure, a scheme is further provided, which determines signal belonging to the same chip in the sample sequence experiencing the sum-average operation, and outputs the determined signal; the scheme includes the following steps: sending $W_{I1}, W_{I2}, \ldots W_{INs}$ into a matched filter meeting a pre-set condition, obtaining a corresponding output result, and marking the output results separately as $y_{I1}, y_{I2}, \ldots y_{Ins}$; sending $W_{Q1}, W_{Q2}, \ldots W_{QNs}$ into the matched filter, obtaining the corresponding output result, and marking the output results separately as $y_{Q1}, y_{Q2}, \ldots y_{QNs}$; determining signal amplitude values $y_1, y_2, \ldots y_{Ns}$ grouped by the in-phase component signal I and the quadrature component signal Q, according to the output results $y_{I1}, y_{I2}, \ldots y_{Ins}$ and the output results $y_{Q1}, y_{Q2}, \ldots y_{QNs}$; and determining a signal belonging to the same chip, according to the determined signal amplitude value, and outputting the determined signal.

Specifically, the signal amplitude values $y_1, y_2, \ldots y_{Ns}$ are determined according to the following formula: $y_1 = \sqrt{Y_{I1}^2 + Y_{Q1}^2}$, $y_2 = \sqrt{Y_{I2}^2 + Y_{Q2}^2}$, $\ldots$ $y_{Ns} = \sqrt{Y_{INs}^2 + Y_{QNs}^2}$; the corresponding signal when the signal amplitude value is maximum is taken as the signal belonging to the same chip, and the corresponding signal when the signal amplitude value is maximum is output.

Embodiment 2

Figure 5:
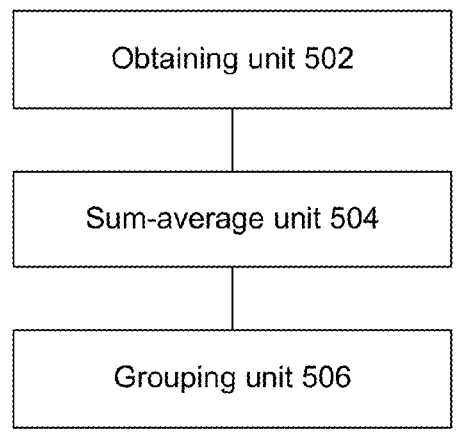
FIG. 5 is a preferred structure diagram of a device for reducing a bit error rate in a CDMA communication system in an embodiment of the disclosure.

Based on the above method for reducing the bit error rate in the CDMA communication system provided by Embodiment 1, this preferred embodiment provides a device for reducing the bit error rate in the CDMA communication system; FIG. 5 is a preferred structure diagram of this device, as shown in FIG. 5, this device includes: an obtaining unit 502, configured to obtain a sample sequence $I_{in}$ of an in-phase component signal I, and a sample sequence $Q_{in}$ of a quadrature component signal Q, which are sent by a signal sending end; a sum-average unit 504, configured to divide the obtained sample sequence $I_{in}$ and the sample sequence $Q_{in}$ into different groups according to a sample number Ns of a chip, perform a sum-average operation on a signal in each group, and determine a corresponding signal group, wherein each signal group contains the signal experiencing the sum average operation, the signal group determined by performing the sum-average operation on the sample sequence $I_{in}$ is $W_I$, the signal group determined by performing the sum-average operation on the sample sequence $Q_{in}$ is $W_Q$; and a grouping unit 506, configured to group the signal in the signal group $W_I$ and the signal group $W_Q$, to determine the signal belonging to the same chip in the sample sequence experiencing the sum-average operation, in the signal group $W_I$ and the signal group $W_Q$, and output the determined signal.

In the above preferred embodiment, after performing the sum-average operation on the signal sample sequence, the signal is grouped, in the grouped signal, the sample sequence experiencing the sum-average operation from the same chip is selected, and the signal of the sample sequence from the same chip is output; this kind of signal processing way solves the problem in the related art that the CDMA synchronization algorithm possesses the wrong sampling situation, which results in the high bit error rate of the receiving end, and effectively reduces the core error rate.

Figure 6:
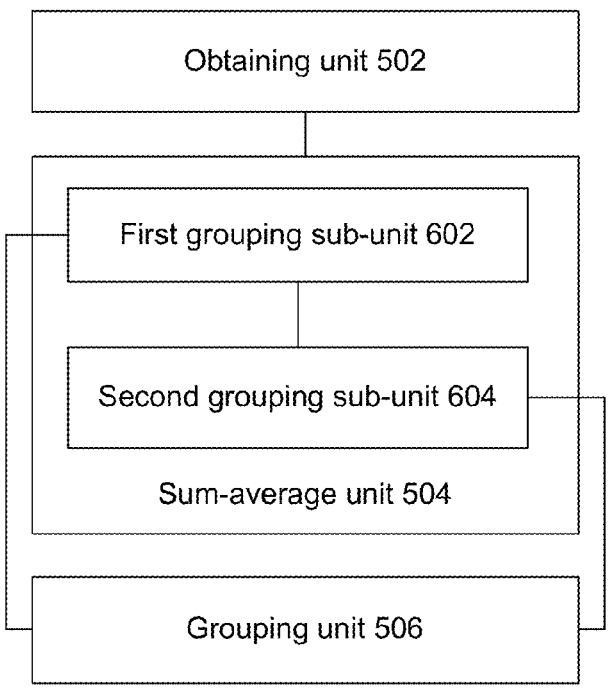
FIG. 6 is another preferred structure diagram of the device for reducing the bit error rate in the CDMA communication system in an embodiment of the disclosure.

In a preferred embodiment of the disclosure, the above device is further optimized, specifically, a scheme is provided which performs grouping and sum-average on the sample sequence $I_{in}$ and the sample sequence $Q_{in}$, as shown in FIG. 6, the sum-average unit 504 includes: a first grouping sub-unit 602, configured to divide adjacent Ns samples in the sample sequence $I_{in}$ into one group, and successively perform the sum-average operation on Ns samples in each group, and determine the signal group $W_I$; and a second grouping sub-unit 604, configured to divide adjacent Ns samples in the sample sequence $Q_{in}$ into one group, and successively perform the sum-average operation on Ns samples in each group, and determine the signal group $W_Q$. For example, it is assumed that the sample number of each chip is Ns=2, and the sample sequence $I_{in}$ is shown in FIG. 4, which contains the following samples: X1, X2, X3, X4, X5, X6, X7, X8, then adjacent 2 sample signals in the sample sequence are obtained and experience the sum-average operation, to obtain the signal group $W_I$, which successively includes $$\frac{x1+x2}{2}, \frac{x2+x3}{2}, \frac{x3+x4}{2}, \frac{x4+x5}{2}, \frac{x5+x6}{2}, \frac{x6+x7}{2}, \frac{x7+x8}{2}.$$

Grouping the sample sequence $Q_{in}$ is the same as grouping the sample sequence $I_{in}$, and will not be repeated again.

In the above preferred technical scheme, grouping and sum-average are performed on all adjacent Ns samples in the sample sequence $I_{in}$ and the sample sequence $Q_{in}$, to guarantee that the signal experiencing the sum-average operation not only contains an ideal sampling situation, but also contains the wrong sampling situation, and to reduce the core error rate by selecting the signal in the ideal sampling situation.

Figure 7:
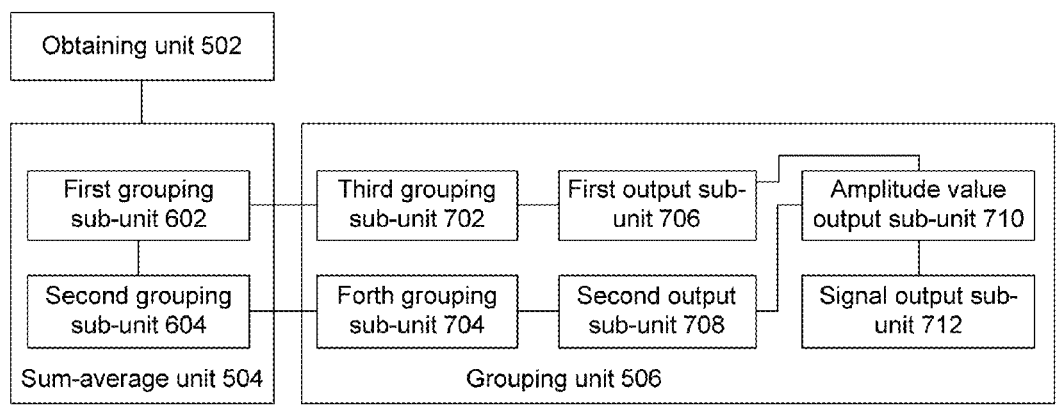
FIG. 7 is another preferred structure diagram of the device for reducing the core error rate in the CDMA communication system in an embodiment of the disclosure.

In a preferred embodiment of the disclosure, the above device is further optimized, specifically, a scheme is provided which groups the signal group $W_I$ and the signal group $W_Q$, as shown in FIG. 7, the grouping unit 506 includes:

a third grouping sub-unit 702, configured to, in the signal group $W_I$, begin from a first signal, extract a signal after Ns−1 signals, successively group each extracted signal into one group; begin from a second signal, extract a signal after Ns−1 signals, successively group each extracted signal into one group, and so on, obtain Ns groups of signals, which are successively marked as $W_{I1}, W_{I2}, \ldots, W_{INs}$; and a forth grouping sub-unit 704, configured to, in the signal group $W_Q$, begin from a first signal, extract a signal after Ns−1 signals, successively group each extracted signal into one group; begin from a second signal, extract a signal after Ns−1 signals, successively group each extracted signal into one group, and so on, obtain Ns groups of signals, which are successively marked as $W_{Q1}, W_{Q2}, \ldots W_{QNs}$.

The example provided above is further explained, specifically, the above signal group $W_I$ is $$\frac{x1+x2}{2}, \frac{x2+x3}{2}, \frac{x3+x4}{2}, \frac{x4+x5}{2}, \frac{x5+x6}{2}, \frac{x6+x7}{2}, \frac{x7+x8}{2},$$

when performing grouping, beginning from the first signal, signal extraction is perform after 1 signal, therefore $$\frac{x1+x2}{2}, \frac{x3+x4}{2}, \frac{x5+x6}{2} \text{ and } \frac{x7+x8}{2}$$

are extracted successively, and are taken as the first group, $$\frac{x2+x3}{2}, \frac{x4+x5}{2}, \text{ and } \frac{x6+x7}{2}$$

are taken as the second group; it can be seen from the drawing, the group of data $$\frac{x1+x2}{2}, \frac{x3+x4}{2}, \frac{x5+x6}{2}, \text{ and } \frac{x7+x8}{2}$$

do not come from the same chip, but come from adjacent chips, this is the wrong sampling situation; the group of data $$\frac{x2+x3}{2}, \frac{x4+x5}{2}, \text{ and } \frac{x6+x7}{2}$$

come from the same chip, this is the ideal sampling situation.

Preferably, as shown in FIG. 7, the grouping unit 506 further includes: a first output sub-unit 706, configured to send the $W_{I1}, W_{I2}, \ldots W_{INs}$ into a matched filter meeting a pre-set condition, obtain a corresponding output result, and mark the output results separately as $y_{I1}, y_{I2}, \ldots y_{Ins}$; a second output sub-unit 708, configured to send the $W_{Q1}, W_{Q2}, \ldots W_{QNs}$ into the matched filter, obtain the corresponding output result, and mark the output results separately as $y_{Q1}, y_{Q2}, \ldots y_{QNs}$; an amplitude value output sub-unit 710, configured to determine signal amplitude values $y_1, y_2, \ldots y_{Ns}$ grouped by the in-phase component signal I and the quadrature component signal Q, according to the output results $y_{I1}, y_{I2}, \ldots y_{Ins}$ and the output results $y_{Q1}, y_{Q2}, \ldots y_{QNs}$; and a signal output sub-unit 712, configured to determine the signal belonging to the same chip, according to the determined signal amplitude value, and output the determined signal.

Specifically, the amplitude value output sub-unit 710 includes: an amplitude value calculating module, configured to determine the signal amplitudes $y_1, y_2, \ldots y_{Ns}$ according to the following formula:

$$y_1 = \sqrt{Y_{I1}^2 + Y_{Q1}^2}, y_2 = \sqrt{Y_{I2}^2 + Y_{Q2}^2}, \ldots y_{Ns} = \sqrt{Y_{INs}^2 + Y_{QNs}^2};$$

the signal output sub-unit 712 includes: a signal output module, configured to take the corresponding signal when the signal amplitude value is maximum as the signal belonging to the same chip, and output the corresponding signal when the signal amplitude value is maximum.

Embodiment 3

Figure 8:
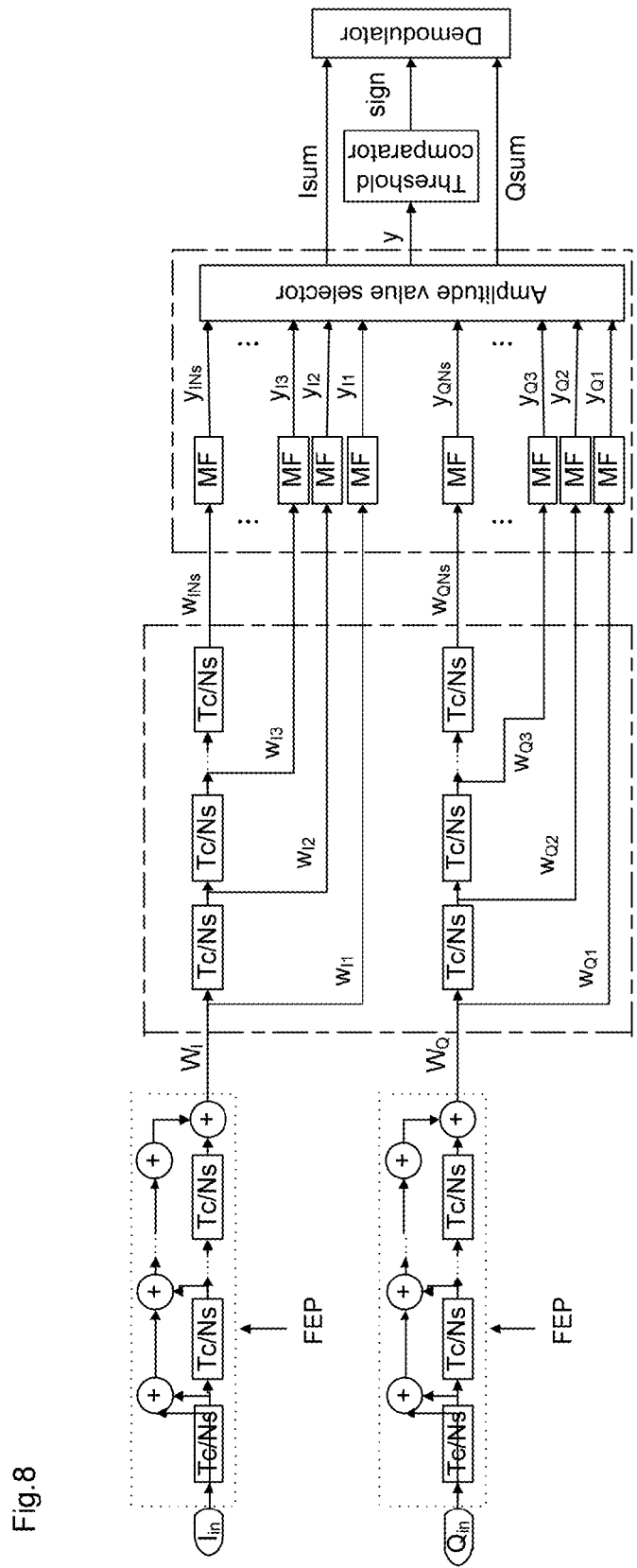
FIG. 8 is a hardware logic diagram of the method for reducing the core error rate in the CDMA communication system in an embodiment of the disclosure.

Based on the method for reducing the bit error rate in the CDMA communication system provided by Embodiment 1 and the device for reducing the bit error rate in the CDMA communication system provided by Embodiment 2, this preferred embodiment provides another method for reducing the bit error rate in the CDMA communication system; FIG. 8 shows a hardware implementation logic diagram of this method, in FIG. 8, Tc is a chip delay time (chip period), and Ns is a sample number of the chip. In implementation of this method, mainly several groups of delayers and the matched filter group MF are separately added behind two channels of input signals $I_{in}$ and $Q_{in}$, behind the filter, accurate synchronization of data is implemented through a maximum amplitude value selector, to eliminate a serious inter-code interference caused by wrong sampling, and to reduce a high bit error rate brought by an inter-code interference of a traditional method.

Specifically, the above method includes the following steps:

1. performing sum-average on the sample sequence;

as shown in FIG. 8, the input signals $I_{in}$ and $Q_{in}$ are a group of sample sequence, a sampling frequency is Ns times/one chip (one chip samples Ns times). Every adjacent Ns sample values are added and divided by Ns, to obtain $W_I$ and $W_Q$, a purpose of this step is to store the results after performing sum-average in all sampling ways (ideal sampling, wrong sampling) into two channels of signals $W_I$ and $W_Q$. Preferably, in order to make calculation convenient and reduce a hardware resource cost, Ns is set as powers of 2.

2. grouping two channels of signals $W_I$ and $W_Q$;

the purpose of grouping two channels of signals $W_I$ and $W_Q$ is to find a most ideal sample, and eliminate an inter-chip interference caused by wrong sampling, specifically, as shown in FIG. 8, in two channels of signals $W_I$ and $W_Q$, elements separated by Ns−1 (Ns is a sampling number of the chip) elements are separately grouped into one group. Specifically, $W_I$ is a signal group obtained by performing Step 1 on I channels of signals, and includes multiple signals, which are marked as $W_I = (W_I(0), W_I(1), WI(2), \ldots, W_I(Ns), W_I(Ns+1), W_I(Ns+2), \ldots, W_I(2*Ns), W_I(2*Ns+1), W_I(2*Ns+2), \ldots)$, that is, $W_I$ is composed of $W_I(i)$. In the same way, $W_Q$ and $W_I$ have the same structure feature, and $W_Q$ is composed of $W_Q(i)$. $W_I$ is grouped into Ns groups with a distance of Ns−1 elements, $w_{I1} = (W_I(0), W_I(Ns), W_I(2*Ns), W_I(3*Ns), \ldots), w_{I2} = (W_I(1), W_I(Ns+1), W_I(2*Ns+1), W_I(3*Ns+1), \ldots), wI3 = (W_I(2), W_I(Ns+2), W_I(2*Ns+2), W_I(3*Ns+2), \ldots), \ldots, w_{INs} = (W_I(Ns-1), W_I(Ns+Ns-1), W_I(2*Ns+Ns-1), W_I(3*Ns+Ns-1), \ldots)$, and a grouping relationship of $W_Q$ is the same as that of $W_I$, and will not be repeated again.

In FIG. 8 adopts a delayer to implement grouping. Tc represents a chip delay time (a chip transmission rate is 1/Tc), MF in the drawing is the matched filter, and a work clock frequency is 1/Tc. A simple delayer is added between the traditional matched filter and a Front End Processor (FEP) output, and the signals are divided into Ns groups through driving of a sample clock (a sample clock frequency is Ns/Tc). Through improvement of this method, all grouped $W_{Ii}$ and $W_{Qi}$ are sent to a matched filter group, in which one group of data must come from the same chip, the amplitude value matched and output in this way will be larger than that obtained in a traditional method, and an interference resistance ability of a system is improved.

Figure 9:
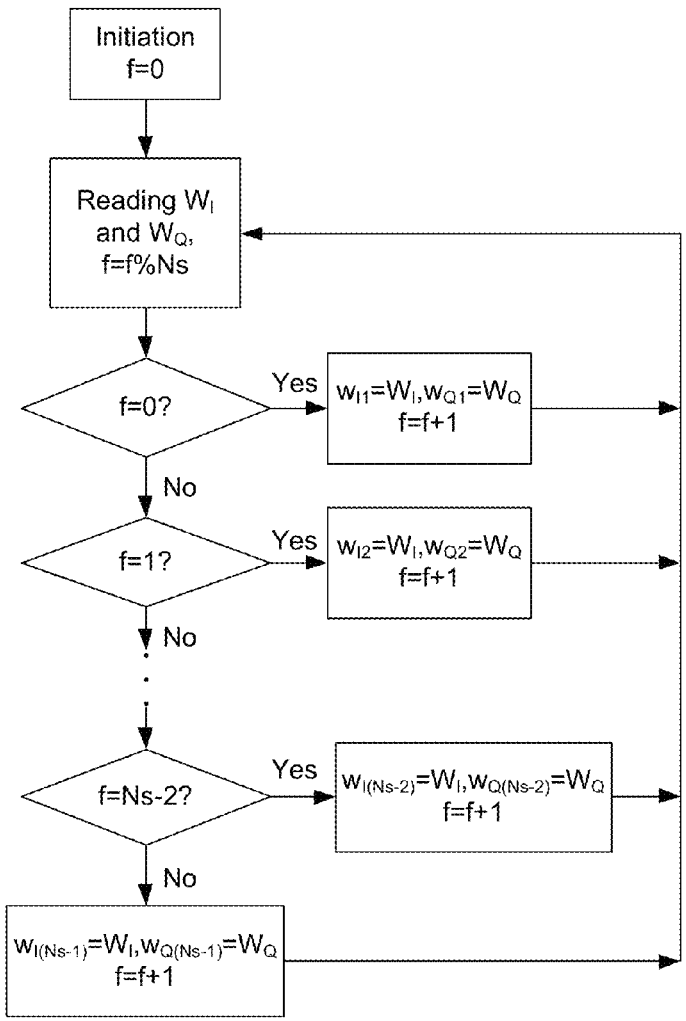
FIG. 9 is a flowchart of grouping through software in the method for reducing the bit error rate in the CDMA communication system in an embodiment of the disclosure.

In addition, a grouping way may also be implemented through software programming, a specific algorithm flowchart is shown in FIG. 9, during grouping, first a variable flag (called a variable f for short) is defined, of which an initial value is 0, and then $W_I$ and $W_Q$ output by the sum-average unit are read through driving of each sample clock, simultaneously a modulo of the sample number Ns is calculated with the variable flag, namely flag=flag % Ns; assigning the sample value of the current $W_I$ and $W_Q$ to corresponding groups $W_{Ij}$ and $W_{Qj}$, is decided according to a value of the variable flag (0, 1, . . . Ns−2, Ns−1), and simultaneously flag is added by 1, and a next signal in $W_I$ and $W_Q$ is obtained continuously to perform grouping, until grouping is completed, and finally $W_I$ and $W_Q$ are separately divided into Ns groups of signals.

Figure 10:
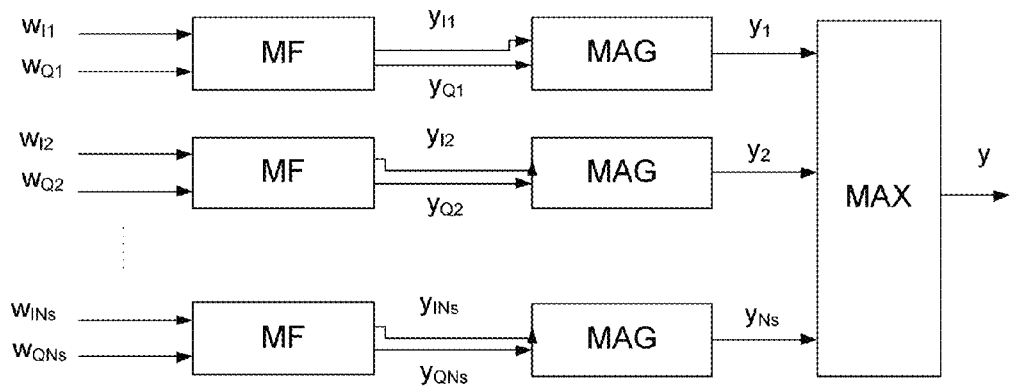
FIG. 10 is a logic diagram of determining a maximum amplitude value in the method for reducing the core error rate in the CDMA communication system in an embodiment of the disclosure.

3. calculating the maximum amplitude value;

the grouped signals $W_{Ij}$ and $W_{Qj}$ are separately sent into the matched filter MF, as shown in FIG. 10. Matched outputs $y_{Ij}$ and $y_{Qj}$ are obtained. $y_{Ij}$ and $y_{Qj}$ are sent to an amplitude generator MAG, the amplitude generator MAG calculates a root of a quadratic sum of $y_{Ij}$ and $y_{Qj}$ to obtain the amplitude value $y_j$. In step 2, $W_I$ and $W_Q$ are divided into Ns groups, then there are totally Ns amplitude values output here. All output amplitude values are sent to the maximum amplitude selector MAX, and the maximum amplitude selector MAX selects a maximum value from $y_1$ to $y_{Ns}$ as the current output y. Simultaneously $y_{Ij}$ and $y_{Qj}$ constructing this maximum amplitude value are separately assigned to $I_{sum}$ shown in FIG. 8 and $Q_{sum}$ shown in FIG. 8.

4. judgment and demodulation;

when the output y is larger than a threshold, the sign shown in FIG. 8 changes from a high electrical level to a low electrical level, otherwise the sign is the low electrical level. When the sign changes from the low electrical level to the high electrical level, a demodulator reads $I_{sum}$ and $Q_{sum}$ to perform a code demodulation operation.

Through the above several steps, a group of sample values may be found which are all weighted signal values in the same chip; a serious inter-chip interference existed in a traditional rough synchronization algorithm is eliminated, and the bit error rate is reduced to a big extent. Accurate CDMA synchronization is implemented.

Although for the purpose of making an example, the preferred embodiment of the disclosure is disclosed, those skilled in the art will be conscious of a possibility of improvement, increase, and substitution. Therefore, the scope of the disclosure shall not be limited to the above embodiment.

What is claimed is:

1. A method for reducing a bit error rate in a Code Division Multiple Access (CDMA) communication system, comprising:

obtaining, by a Front End Processor (FEP), a sample sequence $I_{in}$ of an in-phase component signal I, and a sample sequence $Q_{in}$ of a quadrature component signal Q, which are sent by a signal sending end;

dividing the obtained sample sequence $I_{in}$ and the sample sequence $Q_{in}$ by adopting a first delayer into different groups according to a sample number Ns of a chip, performing a sum-average operation on a signal in each group, and determining a corresponding signal group, wherein each signal group contains the signal experiencing the sum-average operation, the signal group determined by performing the sum-average operation on the sample sequence $I_{in}$ is $W_I$, the signal group determined by performing the sum-average operation on the sample sequence $Q_{in}$ is $W_Q$; and grouping, by adopting a second delayer, a signal in the signal group $W_I$ and the signal group $W_Q$, to determine, through a matched filter, a signal belonging to the same chip in the sample sequence which experiences the sum-average operation, in the signal group $W_I$ and the signal group $W_Q$, and outputting the determined signal;

wherein the first delayer is added in the FEP, and second delayer is added between a FEP output and the matched filter;

wherein the dividing the obtained sample sequence $I_{in}$ and the sample sequence $Q_{in}$ by adopting a first delayer into different groups according to the sample number Ns of the chip, performing the sum-average operation on the signal in each group, and determining the corresponding signal group comprises:

dividing adjacent Ns samples in the sample sequence $I_{in}$ into one group, successively performing the sum-average operation on Ns samples in each group, and determining the signal group $W_I$; and dividing adjacent Ns samples in the sample sequence $Q_{in}$ into one group, successively performing the sum-average operation on Ns samples in each group, and determining the signal group $W_Q$;

wherein the grouping the signal in the signal group $W_I$ and the signal group $W_Q$ comprises:

in the signal group $W_I$, beginning from a first signal, extracting a signal after Ns−1 signals, successively combining each extracted signal into one group; beginning from a second signal, extracting a signal after Ns−1 signals, successively combining each extracted signal into one group, and so on, obtaining Ns groups of signals, which are successively marked as $W_{I1}$, $W_{I2}$, ... $W_{INs}$; and in the signal group $W_Q$, beginning from a first signal, extracting a signal after Ns−1 signals, successively combining each extracted signal into one group; beginning from a second signal, extracting a signal after Ns−1 signals, successively combining each extracted signal into one group, and so on, obtaining Ns groups of signals, which are successively marked as $W_{Q1}$, $W_{Q2}$, ... $W_{QNs}$.

2. The method according to claim 1, wherein the determining, through the matched filter, the signal belonging to the same chip in the sample sequence which experiences the sum-average operation and outputting the determined signal comprises:

sending the $W_{I1}$, $W_{I2}$, ... $W_{INs}$ into the matched filter meeting a pre-set condition, obtaining a corresponding output result, and marking the output results separately as $y_{I1}$, $y_{I2}$, ... $y_{Ins}$;

sending the $W_{Q1}$, $W_{Q2}$, ... $W_{QNs}$ into the matched filter, obtaining a corresponding output result, and marking the output results separately as $y_{Q1}$, $y_{Q2}$, ... $y_{QNs}$;

determining signal amplitude values $y_1$, $y_2$, ... $y_{Ns}$ grouped by the in-phase component signal I and the quadrature component signal Q, according to the output results $y_{I1}$, $y_{I2}$, ... $y_{Ins}$ and the output results $y_{Q1}$, $y_{Q2}$, ... $y_{QNs}$; and determining the signal belonging to the same chip, according to the determined signal amplitude value, and outputting the determined signal.

3. The method according to claim 2, wherein the determining signal amplitude values $y_1$, $y_2$, ... $y_{Ns}$ grouped by the in-phase component signal I and the quadrature component signal Q, according to the output results $y_{I1}$, $y_{I2}$, ... $y_{Ins}$ and the output results $y_{Q1}$, $y_{Q2}$, ... $y_{QNs}$, determining the signal belonging to the same chip, according to the determined signal amplitude value, and outputting the determined signal comprises:

determining the signal amplitude values $y_1$, $y_2$, ... $y_{Ns}$ according to a following formula: $y_1 = \sqrt{Y_{I1}^2 + Y_{Q1}^2}$, $y_2 = \sqrt{Y_{I2}^2 + Y_{Q2}^2}$, ... $y_{Ns} = \sqrt{Y_{INs}^2 + Y_{QNs}^2}$; and taking a signal corresponding to a maximum signal amplitude value as the signal belonging to the same chip, and outputting the signal corresponding to the maximum signal amplitude value.

4. A device for reducing a bit error rate in a Code Division Multiple Access (CDMA) communication system, comprising:

a memory storing programming instructions; and a processor configured to be capable of executing the stored programming instructions to:

obtain a sample sequence $I_{in}$ of an in-phase component signal I, and a sample sequence $Q_{in}$ of a quadrature component signal Q, which are sent by a signal sending end;

divide the obtained sample sequence $I_{in}$ and the sample sequence $Q_{in}$ into different groups according to a sample number Ns of a chip, perform a sum-average operation on a signal in each group, and determine a corresponding signal group, wherein each signal group contains the signal experiencing the sum-average operation, the signal group determined by performing the sum-average operation on the sample sequence $I_{in}$ is $W_I$, the signal group determined by performing the sum-average operation on the sample sequence $Q_{in}$ is $W_Q$; and group a signal in the signal group $W_I$ and the signal group $W_Q$, to determine a signal belonging to the same chip in the sample sequence which experiences the sum-average operation, in the signal group $W_I$ and the signal group $W_Q$, and output the determined signal;

wherein the processor is further configured to be capable of executing the stored programming instructions to:

divide adjacent Ns samples in the sample sequence $I_{in}$ into one group, successively perform the sum-average operation on Ns samples in each group, and determine the signal group $W_I$; and divide adjacent Ns samples in the sample sequence $Q_{in}$ into one group, successively perform the sum-average operation on Ns samples in each group, and determine the signal group $W_Q$;

wherein the processor is further configured to be capable of executing the stored programming instructions to:

in the signal group $W_I$, begin from a first signal, extract a signal after Ns–1 signals, successively combine each extracted signal into one group; begin from a second signal, extract a signal after Ns–1 signals, successively combine each extracted signal into one group, and so on, obtain Ns groups of signals, which are successively marked as $W_{I1}, W_{I2}, \ldots W_{INs}$; and in the signal group $W_Q$, begin from a first signal, extract a signal after Ns–1 signals, successively combine each extracted signal into one group; begin from a second signal, extract a signal after Ns–1 signals, successively combine each extracted signal into one group, and so on, obtain Ns groups of signals, which are successively marked as $W_{Q1}, W_{Q2}, \ldots W_{QNs}$.

5. The device according to claim 4, wherein the processor is further configured to be capable of executing the stored programming instructions to:

sending the $W_{I1}, W_{I2}, \ldots W_{INs}$ into the matched filter meeting a pre-set condition, obtain a corresponding output result, and mark the output results separately as $y_{I1}, y_{I2}, \ldots y_{INs}$;

sending the $W_{Q1}, W_{Q2}, \ldots W_{QNs}$ into the matched filter, obtain a corresponding output result, and mark the output results separately as $y_{Q1}, y_{Q2}, \ldots y_{QNs}$;

determine signal amplitude values $y_1, y_2, \ldots y_{Ns}$ grouped by the in-phase component signal I and the quadrature component signal Q, according to the output results $y_{I1}, y_{I2}, \ldots y_{Ins}$ and the output results $y_{Q1}, y_{Q2}, \ldots y_{QNs}$, and determine the signal belonging to the same chip, according to the determined signal amplitude value, and output the determined signal.

6. The device according to claim 5, wherein the processor is further configured to be capable of executing the stored programming instructions to:

determining the signal amplitude values $y_1, y_2, \ldots y_{Ns}$ according to a following formula: $y_1 = \sqrt{Y_{I1}^2 + Y_{Q1}^2}$, $y_2 = \sqrt{Y_{I2}^2 + Y_{Q2}^2}, \ldots y_{Ns} = \sqrt{Y_{INs}^2 + Y_{QNs}^2}$; and take a signal corresponding to a maximum signal amplitude value as the signal belonging to the same chip, and output the signal corresponding to the maximum signal amplitude value.

* * * * *